(12) United States Patent
Heinrich et al.

(10) Patent No.: US 7,881,852 B2
(45) Date of Patent: Feb. 1, 2011

(54) METHOD AND DEVICE FOR DETECTING A LEAK IN AN EXHAUST-GAS SECTION OF A COMBUSTION ENGINE

(75) Inventors: Detlef Heinrich, Ludwigsburg (DE); Anette Luther, Heilbronn (DE)

(73) Assignees: Robert Bosch GmbH, Stuttgart (DE); Audi AG, Neckarsulm (DE)

( * ) Notice: Subject to any disclaimer, the term of this patent is extended or adjusted under 35 U.S.C. 154(b) by 0 days.

(21) Appl. No.: 12/341,527

(22) Filed: Dec. 22, 2008

(65) Prior Publication Data

US 2009/0265074 A1    Oct. 22, 2009

(30) Foreign Application Priority Data

Dec. 27, 2007    (DE) .................. 10 2007 062 794

(51) Int. Cl.
  G06F 19/00    (2006.01)
  G01M 15/00    (2006.01)

(52) U.S. Cl. .................. 701/102; 73/40; 73/114.76; 73/114.69

(58) Field of Classification Search .................. 701/102; 73/114.75, 40, 114.69, 114.76; 60/289, 277, 60/290, 293
See application file for complete search history.

(56) References Cited

U.S. PATENT DOCUMENTS

| | | | |
|---|---|---|---|
| 5,542,292 A * | 8/1996 | Schneider et al. | 73/114.69 |
| 7,222,483 B2 * | 5/2007 | Oi et al. | 60/289 |
| 7,562,565 B2 * | 7/2009 | Heinrich et al. | 73/114.69 |
| 2005/0016265 A1 * | 1/2005 | Streib | 73/118.1 |
| 2005/0178272 A1 * | 8/2005 | Kariya et al. | 96/421 |

* cited by examiner

Primary Examiner—Stephen K Cronin
Assistant Examiner—J. Page Hufty
(74) Attorney, Agent, or Firm—Kenyon & Kenyon LLP

(57) ABSTRACT

A method for checking an exhaust-gas section of a combustion engine for a leak, including the following: introducing secondary air into the exhaust-gas section of the combustion engine via a secondary-air valve, determining a measured value that indicates the magnitude of the relative pressure changes due to the expelling of exhaust gas from the combustion engine upstream from the secondary-air valve, and detecting the leak in the exhaust-gas section as a function of the measured value.

21 Claims, 7 Drawing Sheets

METHOD AND DEVICE FOR DETECTING A LEAK IN AN EXHAUST-GAS SECTION OF A COMBUSTION ENGINE

FIELD OF THE INVENTION

The present invention relates to the field of diagnostic methods for combustion engines, in particular to a method for diagnosing the tightness of an exhaust-gas section in a combustion engine.

BACKGROUND INFORMATION

Combustion engines whose combustion gases are routed through a catalytic converter often come equipped with what is known as a secondary-air system. The secondary-air system is provided for more rapid heating of the catalytic converter to a service temperature in a cold-start phase of the combustion engine, by supplying additional air into an exhaust-gas section.

The diagnosis of the tightness of the secondary-air system is usually performed with the aid of the Lambda probe in the exhaust-gas section of a combustion engine. In the process, the secondary-air mass in the exhaust-gas section is calculated with the aid of a generally applicable algorithm. However, this diagnosis possibility of the secondary-air system has the disadvantage that, starting at the instant when the Lambda probe is operative, it is dependent upon the thorough mixing of the secondary air with the combustion gases as well as on the mixture-side pilot control errors during the cold-start phase. New legal provisions mandate that in the future the secondary-air diagnosis can be performed only during the cold-start phase. This is critical in particular in the case of systems that supply the secondary air into the exhaust-gas section only for a brief period of time during the cold-start phase, and also in the case of systems that are equipped with an exhaust-gas turbocharger, since in these cases the Lambda probe reaches its operativeness too late to perform the diagnosis while still in the cold-start phase.

Another possibility for diagnosing the secondary-air system consists of analyzing the pressure in the secondary-air system. To do so, a pressure sensor is installed between the secondary-air pump and the secondary-air valve, and the measured secondary-air pressure is analyzed in order to detect a leak in the secondary-air system by a threshold-value comparison.

The conventional algorithm for detecting an error in the secondary-air system is implemented in that, once the secondary-air pump is turned on, the instantaneously prevailing pressure is measured, noted and the difference is then determined between the instantaneously applied pressure and the pressure upon activation of the secondary air pump. This method has the advantage of eliminating a possibly existing offset error of the pressure sensor. However, detecting a leak downstream from the secondary-air valve with this diagnosis algorithm is error-prone since the secondary-air valve constitutes a throttle for the secondary-air stream, across which a relatively high pressure drop occurs. That means that the pressure drop that occurs on account of a leak downstream from the secondary-air valve is relatively minor in comparison with the pressure drop in the case of a leak upstream from the secondary-air valve. The leak downstream from the secondary-air valve is therefore able to be diagnosed only with a lot of effort and by using very sensitive pressure sensors in the secondary-air system. Furthermore, a relatively low value would have to be specified for the error-detection threshold, so that an insignificant leak upstream from the secondary air valve does not already have the undesired effect of causing the detection and signaling of an error.

Therefore, it is the object of the present invention to provide a method and a device for diagnosing the secondary-air system, with whose aid a leak in the exhaust-gas section especially downstream from the secondary-air valve is able to be detected and, in particular, significant errors between the secondary-air pump and the secondary-air valve are likewise able to be detected in a reliable manner.

SUMMARY OF THE INVENTION

This objective may be achieved by the method and/or by the device described herein.

Further advantageous developments of the present invention are also described herein.

According to a first aspect, a method is provided for checking an exhaust-gas section of a combustion engine for tightness. The method includes the introduction of secondary air into the exhaust-gas section of the combustion engine via a secondary-air valve, the determination of a measured value that indicates the magnitude of the relative pressure changes due to the expelling of exhaust gas from cylinders of the combustion engine, wherein the combustion engine is upstream from the where the secondary-air valve intersects the exhaust-gas section, and the detection of the leak in the exhaust-gas section as a function of the measured value.

One aspect of the above method in the case of systems having a secondary-air system consists of performing a diagnosis for tightness in an exhaust-gas section by evaluating pressure pulsations due to the operation of the combustion engine. This makes it possible to diagnose a leak in the exhaust-gas section downstream from the secondary-air valve in a simple manner.

Furthermore, it is advantageous that no conflict in goals arises in the check for tightness upstream from the secondary-air valve and in the check for tightness downstream from the secondary-air valve. For the secondary-air valve constitutes a throttle across which a pressure drop occurs even in the open state. If the check for tightness would take place both upstream from the secondary-air valve as well as downstream from the secondary-air valve by way of a threshold-value comparison, then either the threshold for detecting the leak upstream from the secondary-air valve would be too low or the threshold for detecting the leak downstream from the secondary-air valve would be too high. Furthermore, no additional elements such as the Lambda probe are required to detect the error.

In addition, the leak in the exhaust-gas section is able to be detected if the leak is detected by comparing the measured value with an error threshold value, and if it is detected in particular when the measured value is smaller than the error threshold value.

According to one specific embodiment, the error threshold value may be ascertained by determining an expected value from performance quantities of the combustion engine, in particular the engine speed and/or the air charge, in that the expected value is integrated over the measuring time or in that it is normalized with respect to the measuring time.

Furthermore, it is possible to determine the measured value by recording the characteristic of the absolute pressure upstream from the secondary-air valve in that the pressure changes with respect to a moving average value are ascertained therefrom by forming an amount of the pressure changes, and by integrating the amount of the pressure changes and normalizing it with respect to the measuring time.

In one variant, the pressure changes with respect to the average value are able to be determined in that the average value of the pressure characteristic is ascertained by low-pass filtering of the characteristic of the pressure and by determining a difference between the instantaneous pressure upstream from the secondary-air valve and the moving average value.

As an alternative, the pressure changes with respect to the average value may be determined by high-pass filtering, the high-pass filtering being implemented in particular with a frequency limit that is a function of the rotational speed of the combustion engine.

Furthermore, it is possible to provide a plurality of exhaust-gas sections into which the secondary air is introduced during a cold-start phase via corresponding secondary-air valves of a secondary-air system; once the cold-start phase has ended, the secondary-air valves are opened for a period of time one after the other, so that secondary air is introduced into the exhaust-gas section of the combustion engine via a secondary-air valve, the measured value being determined for each of the exhaust-gas sections and a leak in the exhaust-gas section assigned to the particular secondary-air valve that is open being detected as a function of the measured value.

According to a further aspect, an engine control unit is provided to check an exhaust-gas section of a combustion engine for tightness. The engine control unit may be designed to control a secondary-air valve such that secondary air is introduced into the exhaust-gas section of the combustion engine, to determine a measured value that is indicative of the magnitude of the relative pressure changes due to the expelling of exhaust gas from cylinders of the combustion engine upstream from the secondary-air valve, and to detect the leak in the exhaust-gas section as a function of the measured value.

According to another aspect, an engine system is provided, which includes the above engine control unit, the exhaust-gas section as well as a secondary-air system, by which secondary air is able to be introduced into the exhaust-gas section via the secondary-air valve.

According to a further aspect, a computer program is provided, which includes a program code, which implements the above method when it is run on a data processing unit.

Exemplary embodiments of the present invention are explained in greater detail in the following text on the basis of the appended figures.

DETAILED DESCRIPTION

Figure 1:
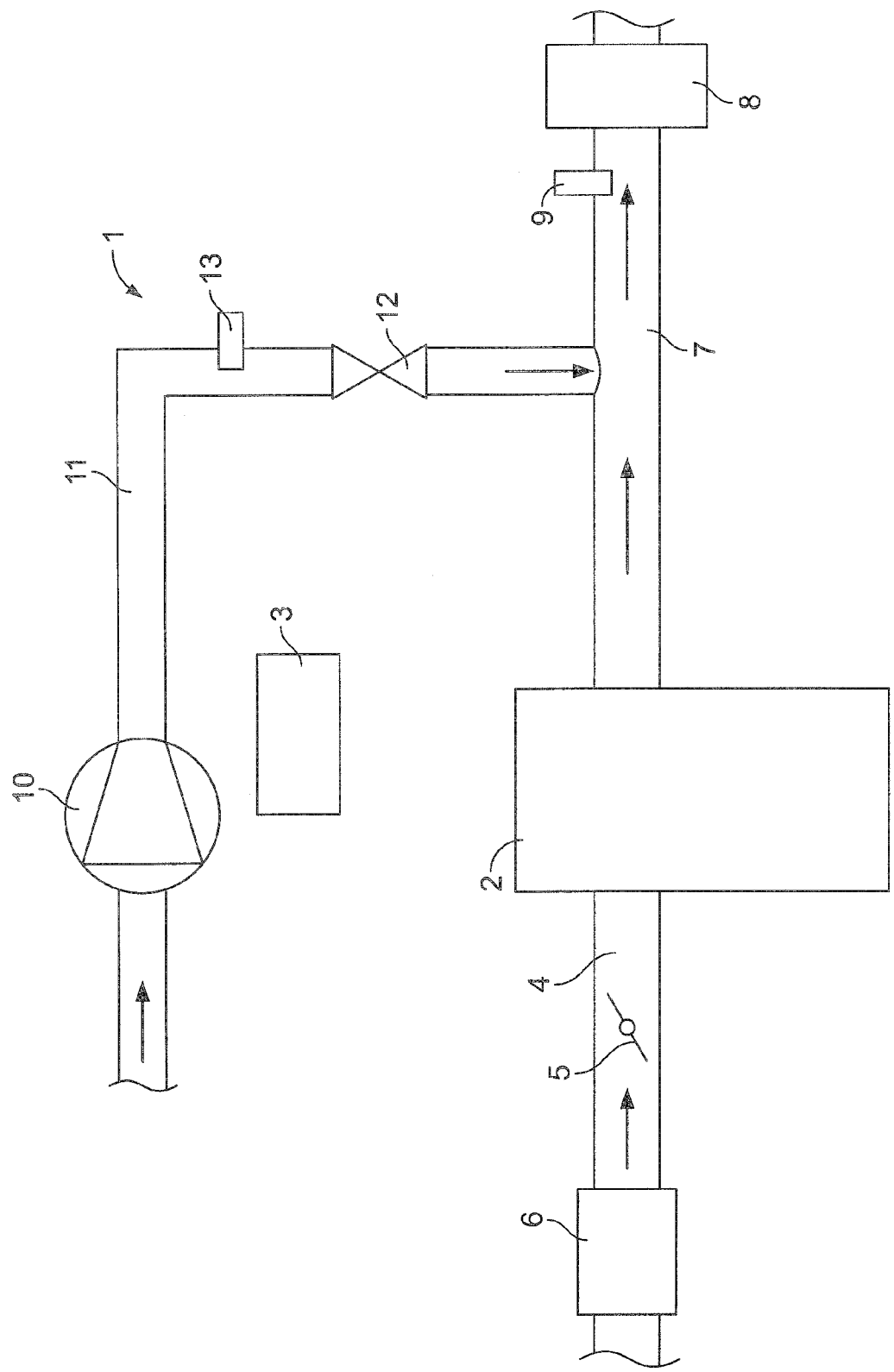
FIG. 1 shows a schematic representation of an engine system having a secondary-air system according to one specific development of the present invention.

FIG. 1 schematically shows an engine system 1 equipped with a combustion engine 2. Combustion engine 2 is an Otto engine, for example, which is operated with the aid of an engine control unit 3. Via an intake manifold 4 inside which a throttle valve 5 is situated, combustion engine 2 is supplied with a specific quantity of air, which is determined via a driver-desired torque and detected via an air-mass sensor 6.

Combustion gases of combustion engine 2 are discharged via exhaust-gas section 7. The combustion exhaust gases are catalyzed in a catalytic converter 8 situated in exhaust-gas section 7. A Lambda probe 9, which is connected to engine control unit 3, is disposed in exhaust-gas section 7 in order to determine the air-fuel ratio of the combustion in the cylinders of combustion engine 2. Engine control unit 3 controls the operation of combustion engine 2 in a manner that is generally known, as a function of the supplied air mass, the measuring signal of the Lambda probe and other variables.

A secondary-air system with whose aid air is able to be supplied to exhaust-gas section 7 in addition, is disposed at exhaust-gas section 7. During a cold-start phase when the catalytic converter is to be heated up as quickly as possible, air is additionally blown into exhaust-gas section 7 so that a secondary reaction comes about in the catalytic converter in connection with excess hydrocarbons and carbon monoxide components in the combustion gases. This makes it possible to reach a light-off temperature of the catalytic converter, i.e., an operation temperature, as rapidly as possible.

The secondary-air system includes a secondary-air pump 10, which is connected to exhaust-gas section 7 via an air deflector 11. A secondary-air valve 12, which like secondary-air pump 10 is able to be controlled by engine control unit 3, is situated in air deflector 11. Secondary-air valve 12 is usually screwed into the exhaust-gas section. Precise control of the supply of secondary air into exhaust-gas section 7 is able to be achieved with the aid of secondary-air valve 12; furthermore, hot combustion exhaust gases are able to be prevented from reaching the output of secondary-air pump 10 during operation with a hot engine. Once the heating of catalytic converter 8 has come to an end and as soon as the light-off temperature has been attained, secondary-air pump 12 is closed as a rule and remains closed throughout the entire operating period of the combustion engine.

A pressure sensor 13 is disposed in air supply 11 between secondary-air pump 10 and secondary-air valve 12 in order to measure the pressure inside air supply 11. With the aid of this pressure sensor 13, a leak in air supply 11, for example between secondary-air pump 10 and secondary-air valve 12, is detected by determining a pressure drop with respect to the expected pressure. Furthermore, when secondary-air valve 12 is open, a statement about a pressure behavior in exhaust-gas section 7 is able to be made with the aid of pressure sensor 13.

In the following text a method is described by which a leak downstream from secondary-air valve 12, i.e., a leak between the combustion engine, catalytic converter 8 and secondary-air valve 12, is able to be detected. The method is explained using the flow chart of FIG. 2 and with the aid of the function diagram of FIG. 3.

In step S1, using a temperature measurement, for example, it is determined whether the operating state of the combustion engine is in a cold-start phase during which catalytic converter 8 is to be heated up. If the combustion engine is in a cold-start phase, then secondary-air pump 10 is switched on in step S2 and secondary-air valve 12 is opened in order to blow air into exhaust-gas section 7 in addition. As a result, the hydrocarbons and carbon monoxide components in the combustion exhaust gas are converted or combusted in catalytic converter 8, so that catalytic converter 8 heats up rapidly. The combustion process in combustion engine 2 gives rise to pressure pulsations in exhaust-gas section 7. The pressure pulsations have a retroactive effect on pressure sensor 13 via opened secondary air valve 12. The pressure pulsations are a function of the engine speed and cause the fluctuations of the pressure about an average value.

In order to determine a measured value for the magnitude of the pressure pulsations, a difference is formed between measured pressure P and an averaged pressure or a pressure $P_{Fil}$ determined in step S3 by low-pass filtering in a subtraction element 18. Filtered pressure signal $P_{Fil}$ roughly corresponds to an average value of the pressure signal recorded by pressure sensor 13.

As an alternative, the characteristic of pressure P of pressure sensor 13 also may be high-pass-filtered, the limit frequency of the high-pass filter lying considerably, i.e., at least 10% to 50%, which may be approximately 20%, above the frequency of the pressure pulsations to be expected at maximum engine speed. As an alternative, the high-pass filter to be used may have a variable limit frequency, which is a function of the engine speed of combustion engine 2, the limit frequency of the high-pass filter lying considerably, i.e., at least 10% to 50%, which may be approximately 20%, above the frequency of the pressure pulsations to be expected at the instantaneous engine speed. In this way a pressure-fluctuation signal $\Delta P$ is obtained, which fluctuates about a zero point. To allow an evaluation of pressure-fluctuation signal $\Delta P$ to be performed, pressure-fluctuation signal $\Delta P$ is converted into an exclusively positive signal in that an amount of pressure-fluctuation signal $\Delta P$ is formed in step S4 in an amount-generation element 19.

In a first integration element 20, the amount of pressure-fluctuation signal $\Delta P$ is integrated over the time (step S5).

In step S6, the integrated pressure-fluctuation signal is normalized in a first normalizing element 21 by dividing it by the elapsed measuring time.

In a step S7, using comparator 22, the normalized integrated pressure-variation signal is then compared to an error threshold value, which indicates the corresponding error threshold. Since the error threshold is a function of operating parameters of combustion engine 2, an expected value E is determined from engine speed D of combustion engine 2 and air charge LF of the cylinders of combustion engine 2 with the aid of a characteristics map 23, which expected error value is correspondingly integrated with the aid of a further integration element 24 having the same characteristics as first integration element 20, and correspondingly normalized by being divided by measuring time $T_{mess}$ in a further normalizing element 25. The result is made available as error threshold value in comparator 22. If the value of the normalized integrated pressure-change signal undershoots the error threshold value, then a leak in exhaust-gas section 7 of the engine system is detected with the aid of output comparator output signal F.

In step S8 it is checked whether engine system 1 is still in the cold-start phase, so that air continues to be blown into exhaust-gas section 7 via the secondary-air system. If yes, then the method steps S2 through S7 are repeated until the end of the cold-start phase. If no, then the diagnosis process is terminated.

The afore-described method makes it possible to detect a leak in exhaust-gas section 7 of combustion engine 2 by checking the pressure pulsations in exhaust-gas section 7, since a leak in exhaust-gas section 7 manifests itself in a reduction in the fluctuation of the pressure characteristic in exhaust-gas section 7. By evaluating the pressure fluctuations in exhaust-gas section 7 with the aid of a suitable measured value that indicates the magnitude of the fluctuations, it is thus possible to detect the presence of a leak in exhaust-gas section 7 downstream from secondary-air valve 12. Due to the fact that only the pressure pulsations, i.e., pressure changes, are taken into account instead of the real pressure in the secondary-air system, pressure sensor 13 in the secondary-air system may continue to be used for detecting a leak in air supply 11 in the secondary-air system, i.e., upstream from secondary-air valve 12, by comparing the secondary-air pressure prevailing there to a suitable threshold value that is exceeded or undershot only in the event of significant leaks.

Figure 4:
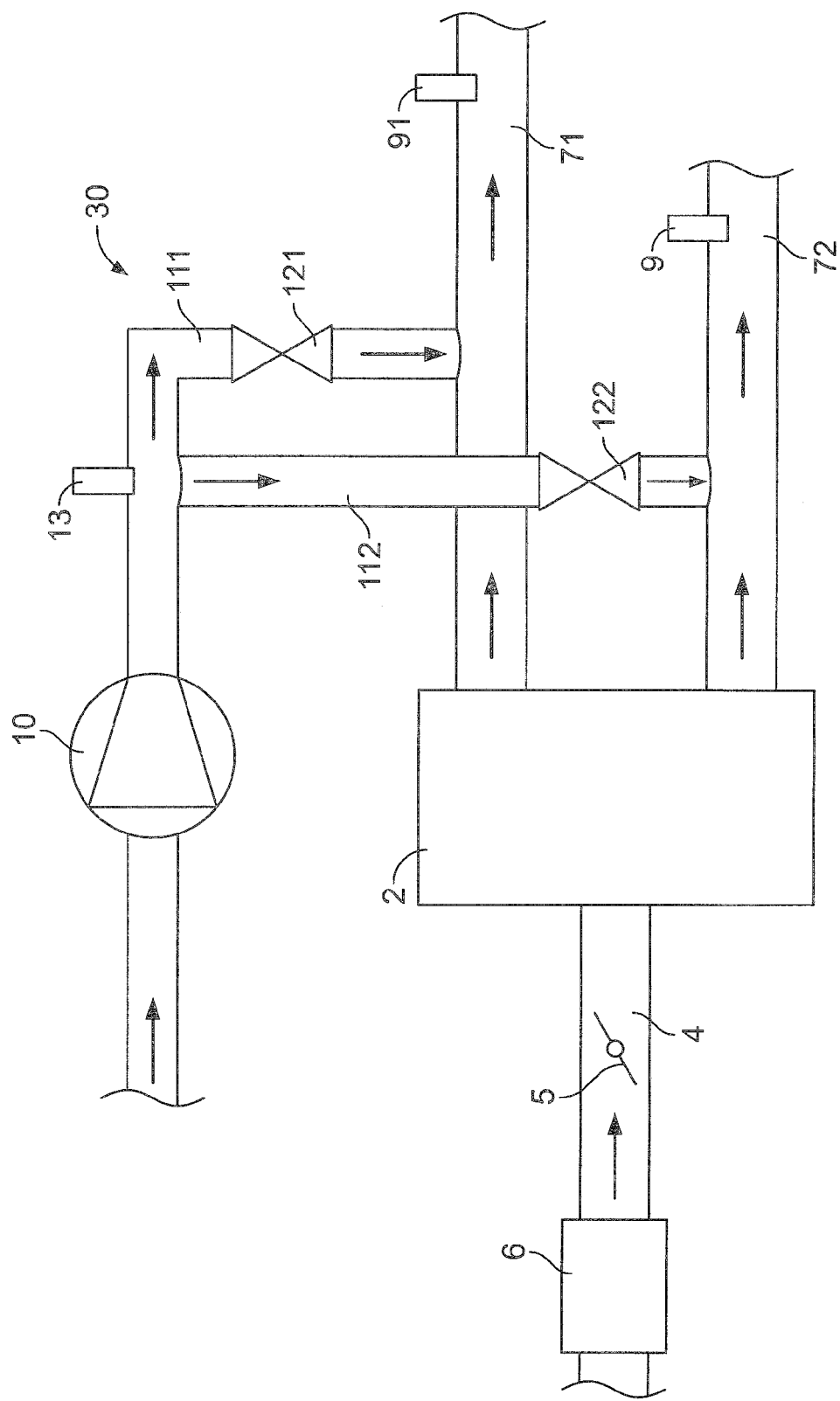
FIG. 4 shows a schematic illustration of another engine system having a secondary-air system, which is provided for two exhaust-gas sections, according to a further specific embodiment of the present invention.

FIG. 4 shows a further engine system 30 according to another specific embodiment. Identical reference numerals refer to elements having identical or comparable functions.

Figure 2:
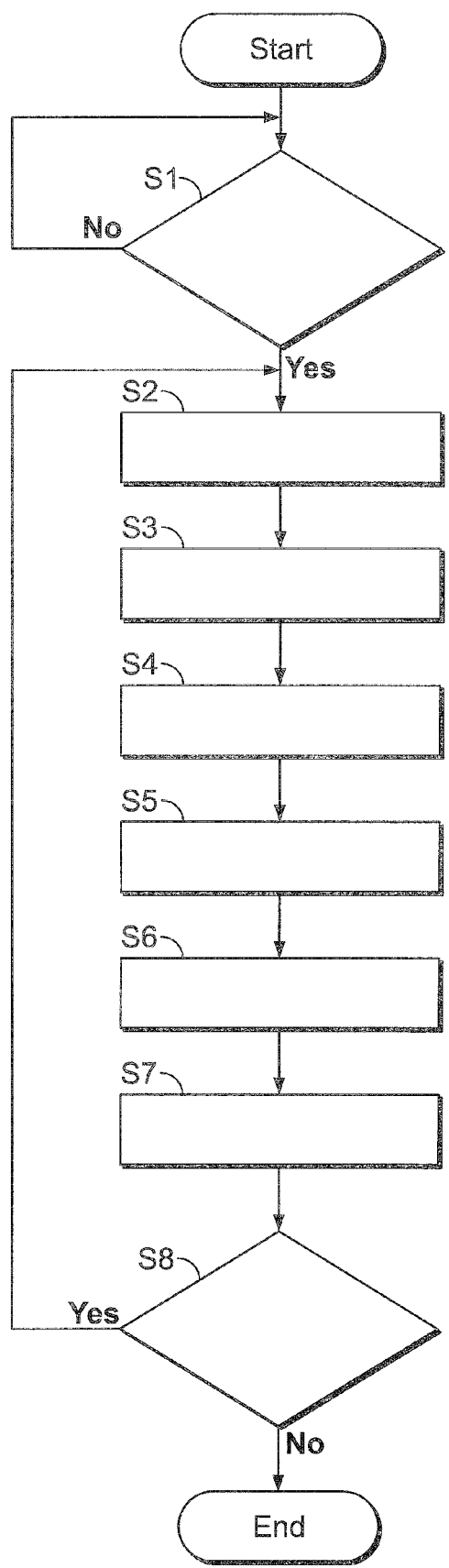
FIG. 2 shows a flow chart illustrating the method according to the present invention.
Figure 3:
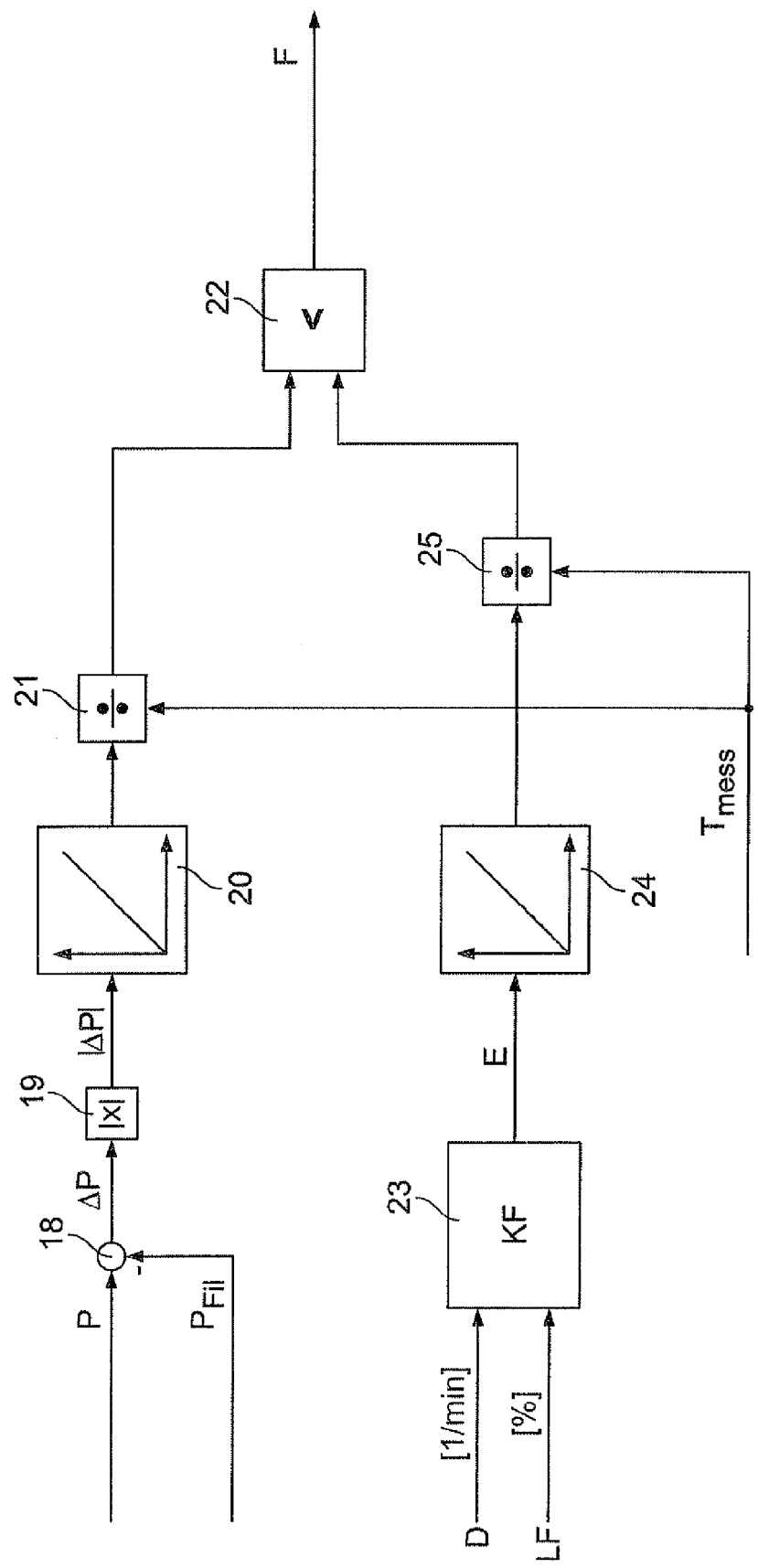
FIG. 3 shows a schematic representation of the function implemented to detect the leak.
Figure 5:
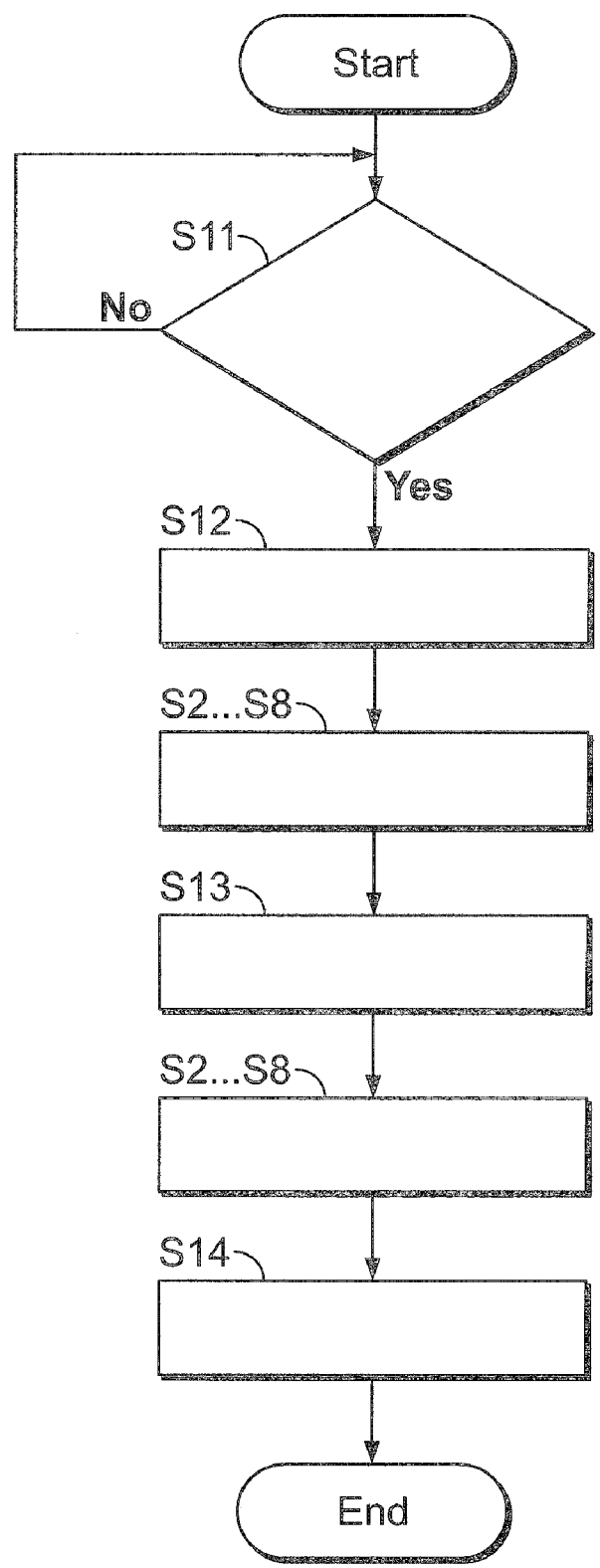
FIG. 5 shows a flow chart to illustrate the method according to a further specific embodiment of the present invention.

In contrast to the specific embodiment of FIG. 1, combustion engine 2 has a first and a second exhaust-gas section 71, 72 which, with a first supply section and/or a second supply section 112, are able to blow air from shared secondary-air pump 10 into respective exhaust-gas sections 71, 72. Each supply section 111, 112 is equipped with a corresponding secondary-air valve 121 and 122. The flow chart of FIG. 5 illustrates the method for performing the diagnosis for leaks in exhaust-gas sections 71, 72. In contrast to the specific embodiment shown in connection with the flow chart of FIG. 2, in the specific embodiment of FIG. 4 the diagnosis for leaks in the exhaust-gas sections is not performed during the entire cold-start phase, but at its end, when the supply with secondary air is to be stopped. If it is determined in step S11 that the cold-start phase is to be ended, e.g., with the aid of a corresponding signal from/in engine control unit 3, then the method of the steps S2 to S8 of FIG. 2 is carried out separately for each exhaust-gas tract. This is done by opening only secondary-air valve 121, 122 that is assigned to the particular exhaust-gas tract 71, 72 to be checked, and closing the respective other. That means that only first secondary-air valve 121 is opened in step S12 and the diagnosis is performed according to steps S2 to S8 of FIG. 2.

Following a specified time interval T1, first secondary-air valve 121 is closed in step S13 and second secondary-air valve 122 is opened, and the method according to steps S2 to S8 is performed anew, so that a leak in second exhaust-gas section 72 is able to be determined in analogous manner. Following a specified time interval T2, second secondary-air valve 122 is closed in step S14 and the diagnosis operation is concluded.

Figure 6:
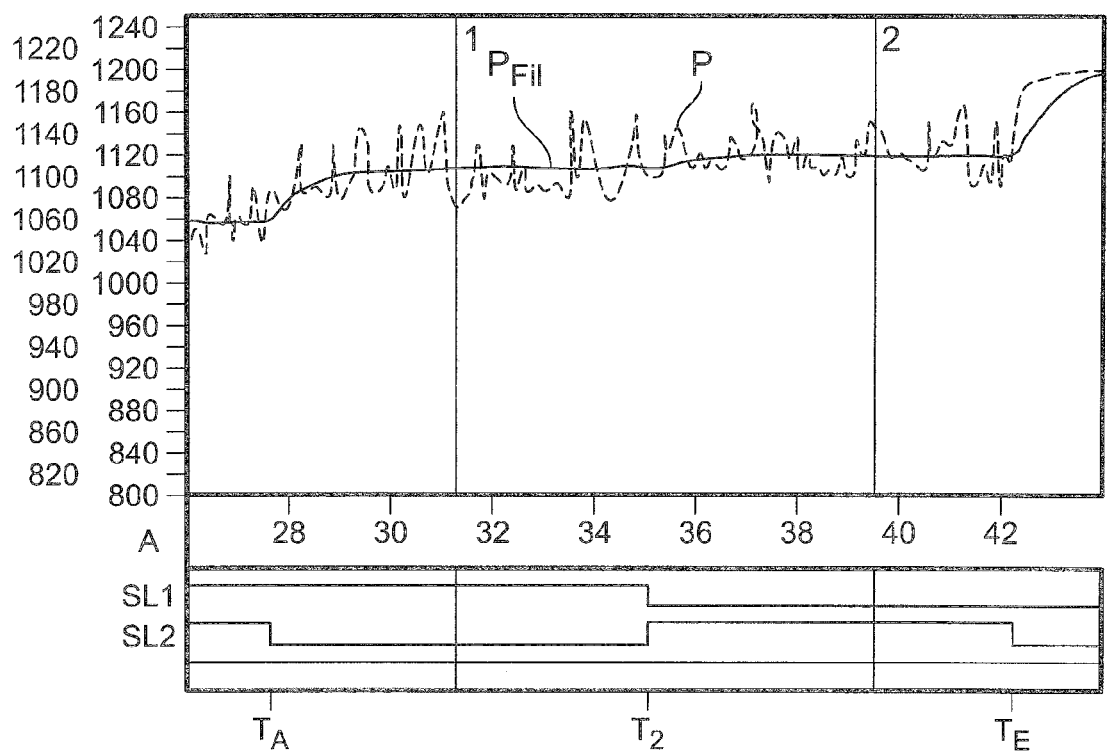
FIG. 6 shows a signal-time diagram to detect a leak between the secondary-air valve and the exhaust-gas tract in an engine system having two exhaust-gas tracts.
Figure 7:
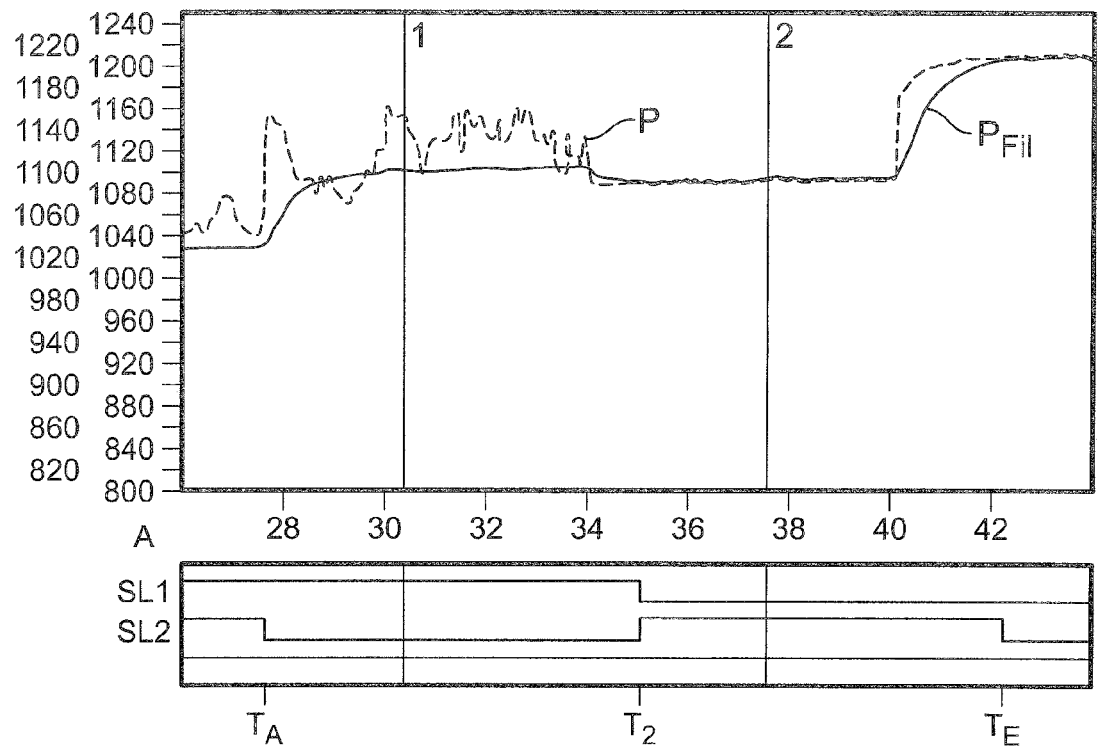
FIG. 7 shows a signal-time diagram corresponding to FIG. 6 in the case of a secondary-air valve that has detached from the exhaust-gas section.
Figure 8:
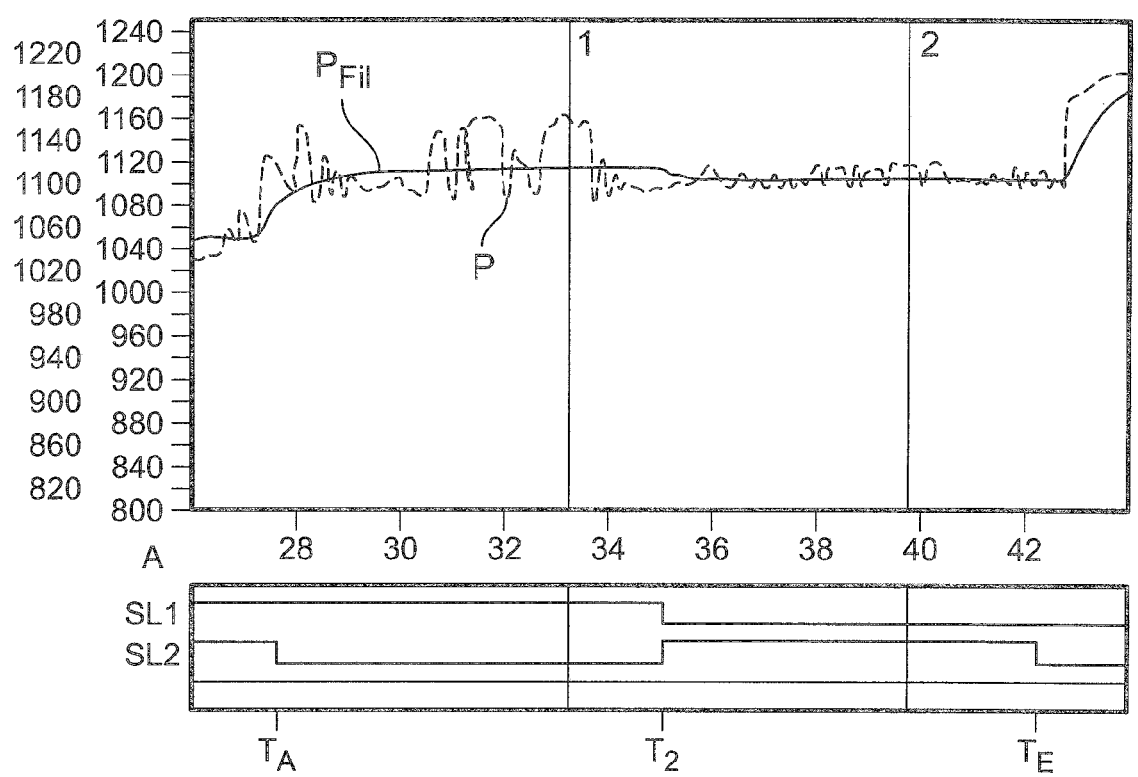
FIG. 8 shows a signal-time diagram according to FIG. 6 with a secondary-air valve that has not been completely screwed into the exhaust-gas section.

FIGS. 6 to 8 show different signal-time diagrams for an engine system of FIG. 4 in proper condition, in a condition in which a second air-supply 112 has completely dropped off from exhaust-gas section 7, and also in a condition in which a secondary-air valve 122 has not been screwed in properly.

FIG. 6 shows the method described in connection with FIG. 5 at the end of the cold-start phase, i.e., when it is signaled that the supply of additional air by the secondary-air system is to be deactivated. This takes place at instant $T_A$. At this point in time second secondary-air valve 122 is switched off by setting signal SL2 to a low level while the signal for triggering first secondary-air valve SL1 remains at a high level. Using the method illustrated with the aid of FIG. 2, a comparison then takes place by comparison with a reference limit value, which is determined by the instantaneous operating state of the combustion engine and which corresponds to a normalized integrated expected value; on the basis of the comparison it is then determined whether there is a leak in first exhaust-gas section 71. If a leak were to exist, then the pressure fluctuations would be lower and the corresponding measured value, which is obtained by integrating the amount of a pressure-fluctuation signal, for example, would be smaller than the reference threshold value.

At instant T2, which is able to be specified as constant or as a function of operating parameters such as, for instance, rotational speed D of combustion engine 2, first secondary-air valve signal SL1 is set to a low level, which causes the closing of first secondary-air valve 121. Essentially at the same time second secondary-air valve signal SL2 is set to high in order to open the secondary-air valve again in this manner. According to the method described in connection with FIG. 2 and according to the functionality illustrated in FIG. 3, the diagnosis for second exhaust-gas section 72 is then performed. Following a specific time interval, (either constant or as a function of a performance parameter), second secondary-air valve signal SL2 is also set to the low level again at instant $T_E$, so that both secondary-air valve signals SL1, SL2 are at the low level and thus no further air is blown into exhaust-gas sections 71, 72.

FIG. 7 illustrates an error case in which the second secondary-air valve has dropped off from exhaust-gas section 7 and thus no air-pressure fluctuation in second exhaust-gas section 72 is detectable any longer even when the second secondary-air valve is opened. This can be observed in the region between instants $T_2$ and $T_E$.

FIG. 8 shows the behavior of the pressure signal in the event that second secondary-air valve 122 is not correctly mounted on exhaust-gas section 7, for example because it was not screwed in properly, so that a leak exists between second secondary-air valve 122 and second exhaust-gas section 72. It can be seen that between the instants $T_2$ and $T_E$ the pressure fluctuations recorded by pressure sensor 13 are clearly lower than the pressure fluctuations that can be observed at pressure sensor 13 with a tight exhaust-gas section, such as first exhaust-gas section 71, for instance. According to the function executed in FIG. 3, such reduced pressure fluctuations would entail a lower measured value, which, for instance, is obtained by generating the amount of the pressure-change signal, integrating the pressure-change signal, and normalizing the pressure-change signal.

The method described in connection with FIG. 5 can also be applied to a greater number of exhaust-gas sections 7, 71, 72; in this case secondary-air valves 121, 122, which are disposed in the individual exhaust-gas sections, are triggered, i.e., opened, individually one after the other in order to execute the afore-described method for each exhaust-gas section 7 in sequence.

What is claimed is:

1. A method for checking an exhaust-gas section of a combustion engine for a leak, the method comprising:
    introducing secondary air into the exhaust-gas section of the combustion engine via a secondary-air valve;
    determining a measured value that indicates the magnitude of the relative pressure changes due to the expelling of exhaust gas from the combustion engine, wherein the combustion engine is upstream from where the secondary-air valve intersects the exhaust-gas section; and
    detecting the leak in the exhaust-gas section downstream from where the secondary-air valve intersects the exhaust-gas section, as a function of the measured value.

2. The method of claim 1, wherein the lack of tightness in the exhaust-gas section is detected if the leak is detected by a comparison of the measured value with an error threshold value.

3. The method of claim 2, wherein the error threshold value is determined in that an expected value is ascertained from performance quantities of the combustion engine by integrating the expected value over the measuring time and normalizing it with respect to the measuring time.

4. The method of claim 1, wherein the measured value is determined in that the characteristic of the absolute pressure upstream from the secondary-air valve is recorded, in that the pressure changes with respect to a moving average value are ascertained therefrom, in that an amount of the pressure changes is formed, and in that the amount of the pressure changes is integrated and normalized with respect to the measuring time.

5. The method of claim 4, wherein the pressure changes are determined with respect to the average value in that the average value of the pressure characteristic is determined by low-pass filtering the characteristic of the pressure and by determining a difference between the instantaneous pressure upstream from the secondary-air valve and the moving average value.

6. The method of claim 4, wherein the pressure changes with respect to the average value are determined by high-pass filtering, the high-pass filtering being implemented in particular at a frequency limit that is a function of the rotational speed of the combustion engine.

7. The method of claim 1, wherein a plurality of exhaust-gas sections is provided into which the secondary air is introduced during a cold-start phase via corresponding secondary-air valves of a secondary-air system, and, after the cold-start phase has ended, the secondary-air valves are opened one after the other for a period of time, so that secondary air is introduced into the exhaust-gas section of the combustion engine via one of the secondary-air valves, the measured value being determined for each exhaust-gas section, and a leak in the exhaust-gas section assigned to the particular open secondary-air valve being ascertained as a function of the measured value.

8. An engine control unit for checking an exhaust-gas section of a combustion engine for a leak, comprising:
    an engine control processing arrangement to perform the following:
        triggering a secondary-air valve so that secondary air is introduced into the exhaust-gas section of the combustion engine,
        determining a measured value that indicates the magnitude of the relative pressure changes due to the expelling of exhaust gas from the combustion engine, wherein the combustion engine is upstream from the secondary-air valve, and
        detecting the leak in the exhaust-gas section downstream from where the secondary-air valve intersects the exhaust-gas section, as a function of the measured value.

9. An engine system, comprising:
    an engine control unit having an engine control processing arrangement;
    an exhaust-gas section; and
    a secondary-air system by which secondary air is able to be introduced into the exhaust-gas section via the secondary-air valve;
    wherein the engine control processing arrangement to perform the following:

triggering a secondary-air valve so that secondary air is introduced into the exhaust-gas section of the combustion engine, determining a measured value that indicates the magnitude of the relative pressure changes due to the expelling of exhaust gas from the combustion engine upstream from the secondary-air valve, and detecting the leak in the exhaust-gas section downstream from where the secondary-air valve intersects the exhaust-gas section, as a function of the measured value.

10. A computer readable medium having a computer program which is executable by a processor arrangement, comprising:

a program code arrangement for performing the following:

triggering a secondary-air valve so that secondary air is introduced into the exhaust-gas section of the combustion engine, determining a measured value that indicates the magnitude of the relative pressure changes due to the expelling of exhaust gas from the combustion engine upstream from the secondary-air valve, and detecting the leak in the exhaust-gas section downstream from where the secondary-air valve intersects the exhaust-gas section, as a function of the measured value.

11. The method of claim 1, wherein the lack of tightness in the exhaust-gas section is detected if the leak is detected by a comparison of the measured value with an error threshold value when the measured value is smaller than the error threshold value.

12. The method of claim 2, wherein the error threshold value is determined in that an expected value is ascertained from performance quantities of the combustion engine, in particular at least one of the engine speed and the air charge, by integrating the expected value over the measuring time and normalizing it with respect to the measuring time.

13. The method of claim 6, wherein a limit frequency of the high-pass filtering is 10% to 50% above the frequency of the pressure changes as a function of a maximum rotational speed of the combustion engine.

14. The method of claim 1, wherein a pressure sensor is between a secondary air pump and the secondary-air valve.

15. The method of claim 1, further comprising:

determining an operating state of the combustion engine by a temperature measurement; and if the combustion engine is in a cold-start phase, switching on a secondary-air pump.

16. The engine system of claim 8, wherein the pressure changes with respect to a moving average value are determined by high-pass filtering, the high-pass filtering being implemented at a frequency limit that is a function of the rotational speed of the combustion engine, and wherein a limit frequency of the high-pass filtering is 10% to 50% above the frequency of the pressure changes as a function of a maximum rotational speed of the combustion engine.

17. The engine control unit of claim 8, wherein a pressure sensor is between a secondary air pump and the secondary-air valve.

18. The engine control unit of claim 8, wherein the engine control processing arrangement determines an operating state of the combustion engine by a temperature measurement, and if the combustion engine is in a cold-start phase, switches on a secondary-air pump.

19. The engine system of claim 9, wherein the pressure changes with respect to a moving average value are determined by high-pass filtering, the high-pass filtering being implemented at a frequency limit that is a function of the rotational speed of the combustion engine, and wherein a limit frequency of the high-pass filtering is 10% to 50% above the frequency of the pressure changes as a function of a maximum rotational speed of the combustion engine.

20. The engine system of claim 9, wherein a pressure sensor is between a secondary air pump and the secondary-air valve.

21. The engine system of claim 9, wherein the engine control processing arrangement determines an operating state of the combustion engine by a temperature measurement, and if the combustion engine is in a cold-start phase, switches on a secondary-air pump.

* * * * *